MAGNETIC MEMORY DEVICE WITH ORTHOGONAL INTERSECTING FLUX PATHS

Filed March 24, 1958 3 Sheets-Sheet 1

INVENTOR.
CRAVENS L. WANLASS
BY HIS ATTORNEYS.
HARRIS, KIECH, FOSTER & HARRIS

MAGNETIC MEMORY DEVICE WITH ORTHOGONAL INTERSECTING FLUX PATHS

Filed March 24, 1958 3 Sheets-Sheet 2

INVENTOR.
CRAVENS L. WANLASS

BY HIS ATTORNEYS.
HARRIS, KIECH, FOSTER & HARRIS

INVENTOR.
CRAVENS L. WANLASS

BY HIS ATTORNEYS.
HARRIS, KIECH, FOSTER & HARRIS 3,134,964

MAGNETIC MEMORY DEVICE WITH ORTHOGONAL INTERSECTING FLUX PATHS

Cravens L. Wanlass, Woodland Hills, Calif., assignor, by mesne assignments, to Ford Motor Company, Dearborn, Mich., a corporation of Delaware Filed Mar. 24, 1958, Ser. No. 723,435
2 Claims. (Cl. 340—174)

This invention relates to memory devices for use in logic systems, computers, and the like, and in particular, to memory devices utilizing orthogonal magnetic fields. Memory devices are important components in various electronic apparatus, such as computers. The capacity of computers is often limited by the physical size, cost, complexity, reliability, etc., of the required memory and by the time consumed in storing and reading information into and out of the memory.

Accordingly, it is an object of the invention to provide a memory device which is simple, compact, inexpensive and reliable and which is adapted for construction as a unitary package for treatment as a plug-in unit. A further object of the invention is to provide such a memory device which requires only electrical conductors and a magnetic material such as iron or ferrite.

It is an object of the invention to provide a memory device comprising a block of magnetic material having at least three conductors passing therethrough, the read and write conductors being parallel to each other and the sense or clock conductor being perpendicular to the read and write conductors. Another object of the invention is to provide a plurality of such memory devices which may be simultaneously interrogated by a single sense pulse.

It is another object of the invention to provide such a memory device in which the magnetic material can be formed in a thin sheet with a large number of such memory devices positioned in the sheet. A further object of the invention is to provide such a memory device which is particularly adapted to the use of ferrite materials as the magnetic material, and in which the ferrite sheet can be formed in the unfired state with the conductor openings therein or with the conductors passing therethrough and then fired to harden and cure the ferrite.

It is a further object of the invention to provide a memory device comprising a block of magnetic material having parallel read and write conductors and an orthogonal sense conductor therethrough, a writing circuit for providing writing currents to the write conductor, an interrogating or information circuit for providing interrogation currents to the sense conductor, and a reading circuit for detecting currents induced into the read conductor by flux changes in the block. Another object is to provide such a memory device wherein the writing current is with a pulse of current or a decaying A.C. current for switching the magnetic material of the block to either a saturated or a no-flux condition. A further object is to provide such a memory device wherein the writing current is a pulse of either positive or negative polarity for switching the magnetic material to either a positive or a negative saturated condition.

It is another object of the invention to provide a memory device in which two bits of information can be stored in a single unit comprising a first pair of parallel read and write conductors disposed perpendicular to a second pair of parallel read and write conductors in a block of magnetic material with a sense conductor therein perpendicular to both pairs.

It is an object of the invention to provide a memory device comprising a block of magnetic material having two or more parallel write conductors therethrough for writing with coincident pulses on the conductors. A further object is to provide a memory device comprising a block of magnetic material having two or more parallel sense conductors therethrough for interrogating the unit with coincident pulses. A further object of the invention is to provide such memory devices utilizing coincident writing and coincident interrogation which can be connected in a matrix with a plurality of similar memory devices to provide nondestructive selection of a unit in the matrix for writing and for interrogation. Another object of the invention is to provide such a memory device for use in matrices which will permit an increase in operating speed by a factor of 100.

It is a further object of the invention to provide a memory device utilizing sheets of magnetic material in which the sheets may be hinged together like pages in a book with the sheets fanned out for ease of wiring, the fan of sheets being closed for insertion in the computer. Another object of the invention is to provide a memory device in which the wired complex of circuits may be potted or incapsulated for use as a plug-in unit.

The invention also comprises novel details of construction and novel combinations and arrangements of parts, which will more fully appear in the course of the following description. The drawings merely show and the description merely describes preferred embodiments of the present invention which are given by way of illustration or example.

The memory device of the invention stores information in binary form, there being two states or conditions for the memory which are ordinarily referred to as the one or positive state and the zero or negative state.

Figure 1:
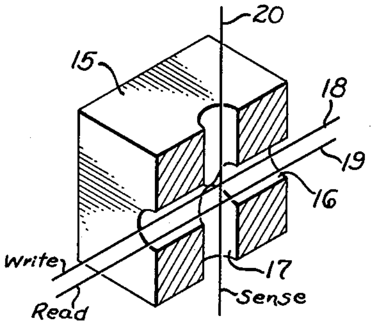
FIG. 1 shows a sectional view of a single memory device of the invention.

FIG. 1 shows a memory device of the invention suitable for storing a single bit of information. A block 15 of magnetic material is provided with a pair of orthogonally disposed, intersecting openings 16, 17 which pass through the block adjacent each other, the block being shown cut vertically down the center. The particular type of magnetic material utilized is not critical, but the material should have sufficient hysteresis characteristic such that magnetic retentivity is present. A material with a rectangular hysteresis loop would be ideal. Ferrite is a suitable material from the manufacturing view and provides satisfactory operation of the memory device.

An electrical conductor referred to as the input or write conductor 18 and another electrical conductor referred to as the output or read conductor 19 are passed through the opening 16. Another electrical conductor referred to as the sense or clock conductor 20 is passed through the other opening 17 with the read and write conductors parallel to each other and perpendicular to the sense conductor.

In the description of the invention given herein, the generation of an output pulse on the read conductor indicates that the memory is in the one state and the absence of a pulse on the read conductor indicates the zero state. Of course, the reverse operation could be obtained if desired.

Figure 2:
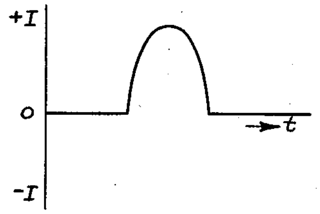
FIG. 2 shows a wave form for the write one current.

A one is written or stored in the memory by applying a current pulse, such as that shown in FIG. 2, to the write conductor 18. The shape, duration and polarity of this current pulse are not critical. It is required that the current be of sufficient magnitude to set the magnetic material of the block adjacent the write and read conductors into the saturated region so that when this write current pulse returns to zero, a magnetic flux will be present in the material perpendicular to the axis of the writing current.

Figure 3:
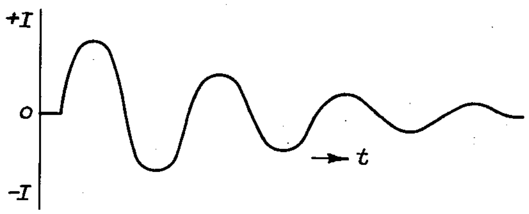
FIG. 3 shows a wave form for the write zero current.

A zero is written or stored in the memory device by applying a demagnetizing or erasing current to the write conductor. This current will be a decaying A.C. current, such as shown in FIG. 3, and will leave the magnetic material adjacent the write and read conductors with substantially no flux perpendicular to the axis of the read and write conductors. The initial polarity, magnitude, and duration of the decaying A.C. current are not critical. It is merely required that the current have peaks of alternating polarity and gradually diminishing magnitude.

Information is read from the memory device by determining whether or not there is a flux perpendicular to the read and write conductors. This interrogation is accomplished by applying a clock or sense pulse to the sense conductor. First, assume that a one has been stored in the memory, a flux thereby being present in the magnetic material perpendicular to the read conductor. When the sense current pulse is applied to the sense conductor, there is a reduction in flux around the read and write conductors due to the retentivity of the material. The partial or total collapse of the magnetic field causes the collapsing field to cut the read conductor generating a pulse signal on the read conductor which indicates that a one is stored.

If the memory has been set to zero and thus has no magnetic flux perpendicular to the read and write conductors, the sense current will cause no change in magnetic field which will cut the read conductor since the sense and read conductors are orthogonal.

While it is not necessary that the sense conductor be exactly perpendicular to the other conductors, it is preferable to maintain these conditions as close as possible, since departures from the orthogonal relations introduce undesired noise and reduce the sensitivity of a component.

Figure 4:
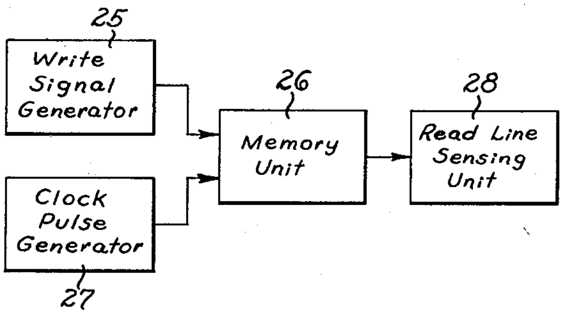
FIG. 4 is a block diagram of a circuit utilizing the memory device of the invention.

FIG. 4 shows, in block diagram form, a circuit suitable for use with the memory device of the invention. A write signal generator 25 is connected to the write conductor of the memory unit 26 which may be the same as the unit of FIG. 1. A clock pulse generator 27 is connected to the sense conductor of the memory unit and a read line sensing unit 28 is connected to the read conductor of the memory unit. The write signal generator 25 provides the currents of FIGS. 2 and 3 as desired. The clock pulse generator 27 provides the current pulse for interrogating the memory unit. The read line sensing unit 28 serves to detect any signals induced in the read conductor, this unit preferably being blocked except when the memory unit is being interrogated.

In an alternative form of the invention, the decaying or damped oscillation of FIG. 3 is not used. The structure of FIG. 1 may be used and a one is written by applying a current pulse of a particular polarity, say positive, to the write conductor. A zero is written by applying a current pulse of the opposite polarity, here negative, to the write conductor. Thus the magnetic material in the region of the write and read conductors is always saturated, with the direction of orientation of the orthogonal flux indicating whether a one or a zero is stored in the unit.

When the clock pulse is applied to the sense conductor to read information from the memory device, an output pulse will always be produced on the read conductor, with the polarity of this pulse indicating the one or zero condition. The magnitude, duration and shape of the write and clock pulses are not material, so long as the pulses are sufficient to produce the desired saturation conditions.

Figure 5:
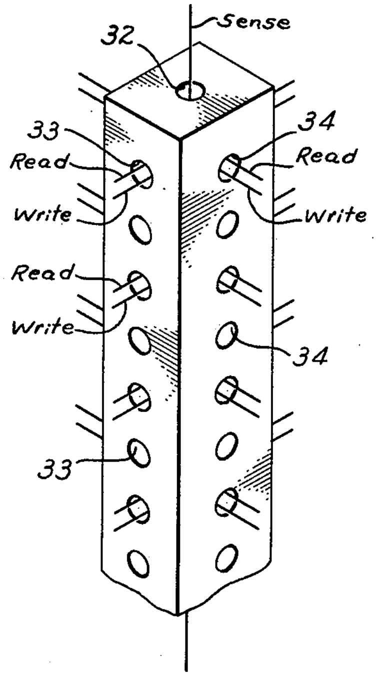
FIG. 5 shows a memory device of the invention for storing a plurality of bits of information.

A number of modifications of the basic memory device of FIG. 1 are shown in FIG. 5. A block 31 of magnetic material is provided with an opening 32 therethrough, a plurality of parallel, spaced openings 33 therethrough perpendicular to the opening 32, and a plurality of parallel, spaced openings 34 therethrough perpendicular to the opening 32 and the openings 33. Each of the openings 33 preferably intersects a corresponding one of the openings 34 and the opening 32 preferably intersects each of these intersecting pairs at the point of intersection.

In one application of this structure, a sense conductor is positioned in the opening 32 and pairs of read and write conductors are positioned in the openings 33. If desired, only every other opening 33 may be used, as shown in FIG. 5, to provide improved isolation between the bits of stored information. Each pair of read and write conductors constitutes a single memory unit in which information can be stored at any time. All of the memory units can be interrogated simultaneously by a single sense pulse providing parallel read out on the read conductors. This modification permits entire computer words to be read out by a single interrogation.

Since the openings 34 are perpendicular to both the opening 32 and the openings 33, pairs of read and write conductors may also be positioned in the openings 34, providing additional storage without any increase in volume. The single sense conductor will provide read out from all of the memory units simultaneously, there being no interaction or interference between the eight memory units shown in the structure of FIG. 5.

An important feature of the embodiment of FIG. 5 lies in the fact that information may be stored in the individual memory units at random times and in any sequence. The information may be read from all of the memory units simultaneously by a single interrogation pulse, or may be read from individual memory units by suitably blocking the remaining read line sensing units.

Figure 6:
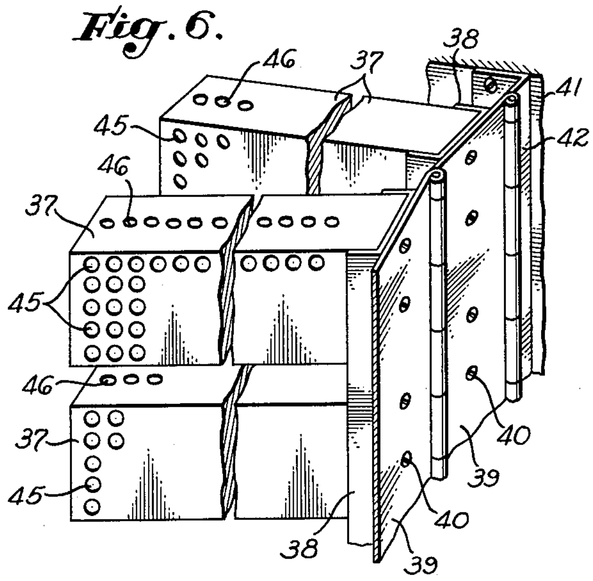
FIG. 6 shows a plurality of interconnected memory devices mounted in a hinged assembly.

FIG. 6 also illustrates how a plurality of the memory devices of the invention may be assembled in a small, compact unit. A plurality of sheets 37 of the magnetic material are mounted in groups in brackets 38 with each bracket being fixed to a hinged plate 39 by suitable means such as screws 40. The hinged plates are coupled in series and may be fixed to a wall or case 41 by a bracket 42 permitting the groups of sheets to be compactly arranged in a parallel plane for minimum space requirements and to be fanned out as shown in FIG. 6 for assembly and testing.

The sheets 37 may be used singly or in groups, depending upon the number of memory units required in the particular application. A sheet is provided with a plurality of horizontal openings 45, preferably arranged in rows of vertical columns, so that vertical openings 46 pass adjacent to or intersect all of the horizontal openings in a single column, a single column corresponding to the structure of FIG. 5 with opening 32 and openings 33. Sense conductors (not shown) are positioned in the vertical openings 46 and pairs of read and write conductors (not shown) are positioned in the horizontal openings 45, with some of the horizontal openings being left vacant for isolation purposes when desired. The particular connections of the memory devices in a sheet or group of sheets are dependent upon the logical operations to be carried out and may be performed by one skilled in the computer art once the novel features of applicant's individual memory devices are understood.

An indication of the compactness achievable by the memory device of the invention is gathered from the fact that sixteen of the horizontal openings 45 may be provided per lineal inch of the sheet of the magnetic material, thereby giving two hundred and fifty-six memory units per square inch of sheet. The sheets may be made by conventional methods such as drilling, casting, and the like. It is also possible to mold the sheets of green unfired ferrite with the openings therein and then fire the ferrite to harden and cure it.

Figure 7:
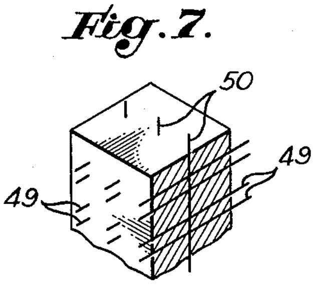
FIG. 7 shows a partial sectional view of an alternative form for one of the sheets of FIG. 6.

An alternative form of the memory device is shown in FIG. 7 wherein no openings are provided in the magnetic material. In this unit, the conductors which form each of the individual memory units are positioned in a fixture so that pairs 49 of read and write conductors cross sense conductors 50 forming the individual memory units at the crossings as in the previous embodiments. Then a mass of uncured ferrite is placed in the fixture filling all the space between the conductors. The assembly is then fired to harden and cure the ferrite, after which the unit is removed from the fixture substantially in the form shown in FIG. 7 and is ready for connection into the rest of the circuit.

Figure 8:
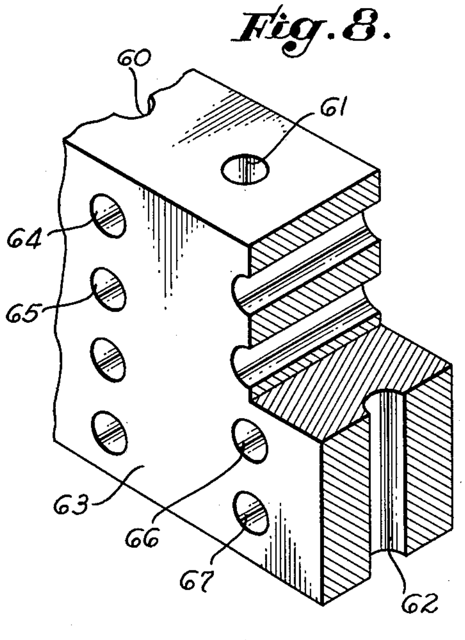

Another form for the magnetic material of the memory device of the invention is shown in FIG. 8. Openings block or sheet 63 of the magnetic material at right angles 60, 61, 62 for the sense conductors are provided in a to openings 64, 65, 66, 67 for the read and write conductors. These orthogonal openings do not intersect but are so positioned that the opening 60 is close to the column of openings including 64 and 65 and the opening 61 is close to the column including the openings 66 and 67, these adjacent orthogonal openings sharing the common magnetic material in the flux zone which separates them to provide memory units which operate in the same manner as those of FIGS. 1 and 5. The spacings or flux zones between corresponding orthogonal openings which make up a single memory unit should be kept small while the spacing between adjacent parallel openings should be several times this small figure so as to substantially eliminate flux interactions between memory units. The nonintersecting hole structure is much easier to wire than the intersecting hole structure such as shown in FIG. 1 since there are no perpendicular intersecting conductors.

Figure 9:
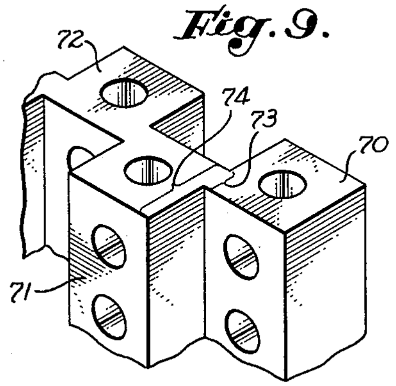
FIGS. 8, 9 and 10 show, in partial sectional form, other alternative forms for the sheets of FIG. 6.
Figure 10:
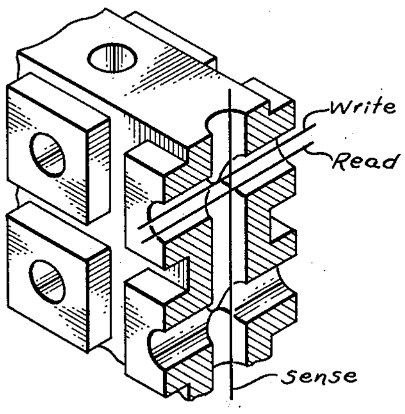

Greater magnetic isolation between memories can be obtained when necessary by using sheets or blocks of magnetic material having irregular surfaces such as shown in FIGS. 9 and 10. In the structure of FIG. 9, the horizontal openings corresponding to the openings 45 of FIG. 6 are disposed in columns 70, 71, 72 with a vertical opening corresponding to the vertical openings 46 of FIG. 6 for each column. The sides of the sheet of the magnetic material are generally corrugated in form such that the cross-sectional area of the junction area between adjacent columns as indicated by the brace 73 is considerably less than the cross-sectional area of a column itself as indicated by the brace 74.

Another form for the magnetic sheet to improve the magnetic isolation is shown in FIG. 10 wherein the cross-sectional area of the magnetic material adjacent the intersecting openings is considerably greater than the cross-sectional area of the magnetic material at points between intersections. The magnetic material structures of FIGS. 9 and 10 are especially adapted to production by molding from unfired ferrite as previously described, either with the openings as shown in FIGS. 9 and 10 or with the conductors molded in place as shown in FIG. 7.

Figure 11:
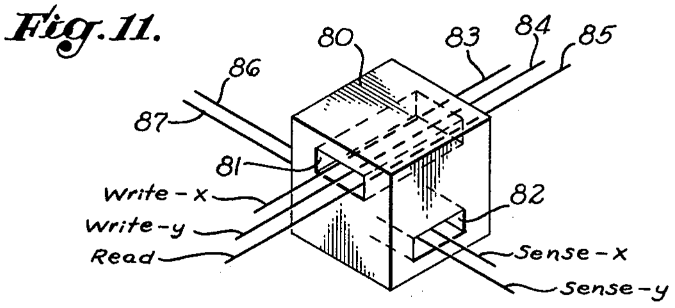
FIG. 11 shows an alternative form of the invention.

An alternative embodiment of the memory device of the invention is shown in FIG. 11. A block 80 of magnetic material is provided with orthogonal openings 81, 82 therethrough with a quantity of the magnetic material providing a flux zone therebetween. Two write conductors 83, 84 and a read conductor 85 are positioned in the opening 81 and two sense conductors 86, 87 are positioned in the opening 82. This unit is ordinarily intended for operation in one or the other of the two saturation conditions achieved by writing with a positive pulse or a negative pulse rather than in the saturation and no flux conditions achieved by writing with a pulse or a damped oscillation.

It has been determined that the product of magnitude of magnetizing current and duration of magnetizing current must exceed a particular value in order to cause the block of magnetic material to switch from the positive saturation condition to the negative saturation condition or vice versa. The critical value of this product of duration and magnitude of magnetizing current or magnetic field which causes the magnetic material to switch from one saturated state to the other saturated state will be referred to as the "oersted-second" value.

The memory device of FIG. 11 can be caused to change states, i.e., a one or a zero can be written in the memory device, by applying half of the required oersted-second field with each write conductor. Similarly, the unit can be interrogated by applying half the oersted-second field to each of the sense conductors at the same tine.

Figure 12:
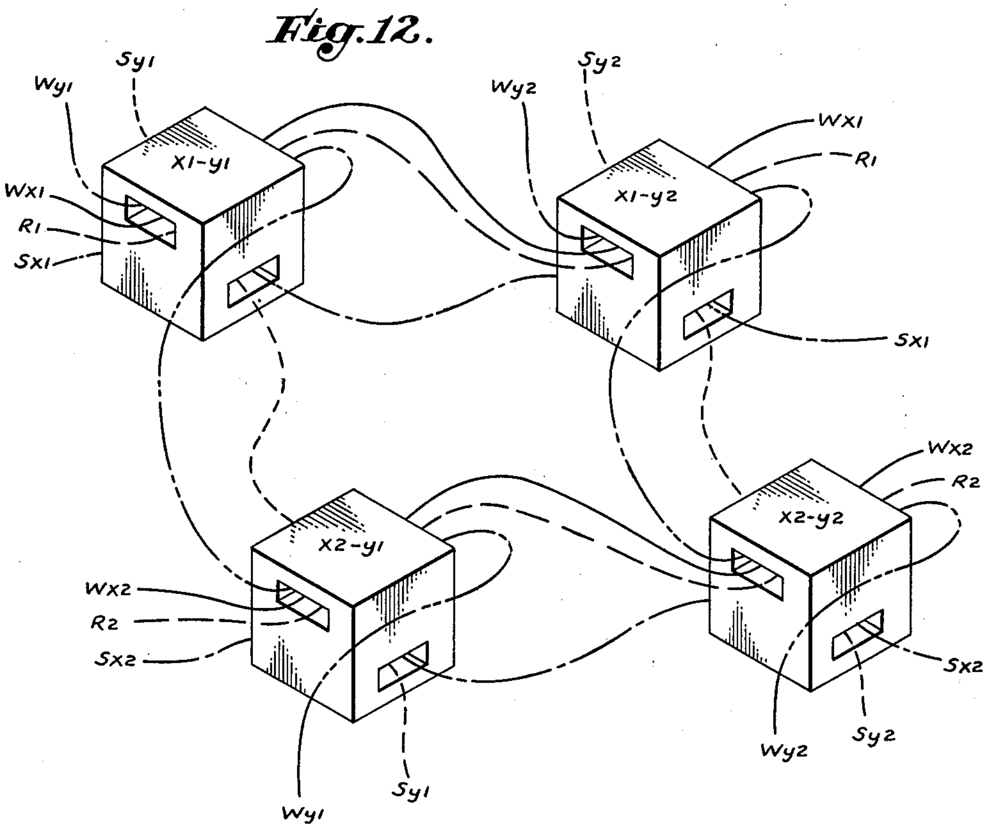
FIG. 12 shows a matrix using a plurality of the memory devices of FIG. 11.

This type of memory device is of particular value in the formation of a nondestructive selection matrix comprising a plurality of memory units. In FIG. 12, four memory devices $x1$—$y1$, $x1$—$y2$, $x2$—$y1$, $x2$—$y2$ are connected in such a matrix. In this particular matrix, the read conductors of $x1$—$y1$ and $x1$—$y2$ are connected in series as are the read conductors of $x2$—$y1$ and $x2$—$y2$. These two read conductors $r1$, $r2$ also can be connected in series if desired. Alternatively, the read conductor of each memory device may be maintained separate from the remaining devices.

The writing currents and the sense or interrogating currents applied to each individual conductor of the matrix of FIG. 12 are restricted to less than the oersted-second value and preferably slightly greater than one-half this value. Thus when this pulse is applied to any single write conductor, there is no change of state in any of the blocks of the matrix. However, when such a pulse is applied to one of the $x$ axis write conductors and one of the $y$ axis write conductors, respectively, there will be coincidence at one of the blocks and a bit of information will be written there. For example, a positive pulse on $wy1$ and $wx2$ will produce a positive saturation at block $x2$—$y1$ without affecting the remaining three blocks.

Similarly, when an interrogation pulse is applied to one of the $x$ axis sense conductors and one of the $y$ axis sense conductors there will be coincidence only at one of the blocks while the remaining blocks are unaffected. Following the above example, if pulses are applied simultaneously to sense conductors $sy1$ and $sx2$, an output pulse will be produced on the read conductor $r2$ indicating for example that the block $x2$—$y1$ was in the positive state. Thus, a particular block of the matrix is selected for writing and for reading without affecting the states of the remaining blocks thereby providing nondestructive selection writing and nondestructive selection reading, providing an improvement in operating speed of the matrix by a factor of about 100 over previously known matrices.

Selective nondestructive read-out is of great value in many applications of memory devices. The memory device of the present invention makes use of the fact that when information is to be used on read out from a particular memory block, each of the appropriate $x$ and $y$ sense conductors for that block direct slightly over one-half of the energy or oersted-seconds required to switch the sense portion of the field of the block. Thus, the selected block receives more than enough energy to switch it in the time duration of the applied pulses. The switching of the sense portion from one saturated state to the other causes a momentary partial collapse of the field of the information portion of the selected block. This causes an output to occur on the read conductor which output is either positive or negative depending upon the information stored (one or zero). The output pulse polarity is independent of the polarity of currents applied to the sense conductors. The process is completely reversible and nondestructive as evidenced by repeated read-out of stored information (millions of times) without regeneration of stored information and without noticeable deterioration of read output signal.

The half selected blocks associated with the $x$ and $y$ sense conductors demonstrate essentially no output during the exact read-out pulse time as evidenced by laboratory tests. This is apparently due to the fact that the momentary interaction between the two orthogonal fields takes place at or close to saturation and is especially evident when switching of one axis takes place. Experimentation has shown this to be true and has also demonstrated that very little effect of this type is present unless the flux is switched. Thus essentially no pickup is present on those blocks that are half selected, permitting nondestructive read-out of a single bit of information from the matrix.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a memory element for storing and reproducing binary information presented in the form of positive and negative voltage pulses, the combination of:

a unitary block of magnetic material with two saturation states and flux retentivity, said block having first and second nonintersecting openings therethrough perpendicular to each other with the openings spaced from each other by a flux zone therebetween, and including a first continuous flux path about said first opening, and a second continuous flux path about said second opening intersecting and perpendicular to said first flux path in said flux zone;

at least one write conductor in said first opening;

writing means for coupling current pulses of positive and negative polarity to said write conductor of magnitudes for selectively switching the saturation state of said first flux path to positive and negative states respectively for storing information in binary form;

at least one sense conductor in said second opening;

clock means for coupling current pulses to said sense conductor for generating flux pulses in said second flux path; and output means for determining flux change in said first flux path during operation of said clock means and developing output current pulses of predetermined polarities corresponding to the polarities of the saturation state of said first flux path.

2. In a memory element for storing and reproducing binary information presented in the form of positive and negative voltage pulses, the combination of:

a unitary block of magnetic material with two saturation states and flux retentivity, said block having first and second nonintersecting openings therethrough perpendicular to each other with the openings spaced from each other by a flux zone therebetween, and including a first continuous flux path about said first opening, and a second continuous flux path about said second opening intersecting and perpendicular to said first flux path in said flux zone;

at least one write conductor in said first opening;

writing means for coupling current pulses of positive and negative polarity to said write conductor of magnitudes for selectively switching the saturation state of said first flux path to positive and negative states respectively for storing information in binary form;

at least one sense conductor in said second opening;

clock means for coupling current pulses to said sense conductor of magnitudes to switch the saturation state of said second flux path from one polarity to the other; and output means for determining flux change in said first flux path during operation of said clock means and developing output current pulses of predetermined polarities corresponding to the polarities of the saturation state of said first flux path.

References Cited in the file of this patent

UNITED STATES PATENTS

| | | |
|---|---|---|
| 2,736,880 | Forrester | Feb. 28, 1956 |
| 2,802,953 | Arsenault | Aug. 13, 1957 |
| 2,810,901 | Crane | Oct. 22, 1957 |
| 2,896,194 | Crane | July 21, 1959 |
| 2,905,834 | Arsenault | Sept. 22, 1959 |
| 2,923,923 | Raker | Feb. 2, 1960 |
| 2,982,947 | Kilburn et al. | May 2, 1961 |
| 3,003,139 | Perkins | Oct. 3, 1961 |
| 3,027,547 | Froehlich | Mar. 27, 1962 |
| 3,061,820 | Wanlass | Oct. 30, 1962 |

OTHER REFERENCES

Publication I, Buck et al., Communications Electronics, pp. 822–830, January 1954.

UNITED STATES PATENT OFFICE

CERTIFICATE OF CORRECTION

Patent No. 3,134,964 May 26, 1964

Cravens L. Wanlass

It is hereby certified that error appears in the above numbered patent requiring correction and that the said Letters Patent should read as corrected below.

Column 5, lines 28 and 29, strike out "block or sheet 63 of the magnetic material at right angles 60, 61, 62 for the sense conductors are provided in a" and insert instead -- 60, 61, 62 for the sense conductors are provided in a block or sheet 63 of the magnetic material at right angles --.

Signed and sealed this 29th day of September 1964.

(SEAL)
Attest:

ERNEST W. SWIDER
Attesting Officer

EDWARD J. BRENNER
Commissioner of Patents